United States Patent [19]
Woller et al.

[11] Patent Number: 5,937,969
[45] Date of Patent: Aug. 17, 1999

[54] HANGING TREE SEAT

[75] Inventors: Ronald R. Woller; John A. Woller, both of Decatur, Ala.

[73] Assignee: Summit Specialties, Inc., Decatur, Ala.

[21] Appl. No.: 09/003,233

[22] Filed: Jan. 6, 1998

[51] Int. Cl.⁶ .................................................. A01M 31/00
[52] U.S. Cl. ............................................................. 182/187
[58] Field of Search ................................... 182/187, 188, 182/135, 136

[56] References Cited

U.S. PATENT DOCUMENTS

| | | | |
|---|---|---|---|
| 4,120,379 | 10/1978 | Carter | 182/187 |
| 4,474,265 | 10/1984 | Shinkle | 182/187 |
| 5,086,874 | 2/1992 | Treants | 182/187 |
| 5,143,177 | 9/1992 | Smith | 182/187 |
| 5,234,077 | 8/1993 | Sheriff | 182/187 |
| 5,297,656 | 3/1994 | Amacker | 182/187 |

*Primary Examiner*—Alvin Chin-Shue
*Attorney, Agent, or Firm*—Arthur A. Gardner & Associates, P.C.

[57] ABSTRACT

A portable tree seat for temporary mounting to a tree includes a frame which has an upright stanchion and a lower fork mounted thereto for partly straddling a tree. An upper lug is mounted to an upper portion of the upright stanchion and a generally U-shaped armrest frame is mounted to the upright stanchion. A seat bottom is suspended from the armrest frame and a lanyard is coupled to the upper lug and adapted to be draped about and secured about the tree to suspend the frame from the tree. With this construction, the portable tree seat is suspended by the lanyard and is stabilized by the fork partly straddling the tree.

17 Claims, 4 Drawing Sheets

HANGING TREE SEAT

TECHNICAL FIELD

The present invention relates generally to chairs for attachment to trees. More particularly, the invention relates to a tree seat which can be hung about the trunk of a tree.

BACKGROUND OF THE INVENTION

Outdoorsmen, such as hunters, naturalists, and photographers, often use tree stands to gain an elevated vantage point. To accommodate this need, it has become common to use tree stands to provide a stable platform above the ground. Numerous designs involving a variety of construction techniques for tree stands are known.

Outdoorsmen using tree stands for extended periods of time can tire of standing and prefer to sit down. As a result, a variety of tree stands have also been provided with seats of different characteristics. For example, U.S. Pat. No. 5,413,192 of Woller. et al relates to a tree stand with a conforming seat. Some other examples of tree stands with seats include U.S. Pat. No. 5,090,504 of Amacker; U.S. Pat. No. 5,105,910 of Engstrom; U.S. Pat. No. 5,165,500 of Bass; U.S. Pat. No. 5,316,104 of Amacker; U.S. Pat. No. 5,394,957 of Doby; U.S. Pat. No. 5,439,074 of Trout, et al; and U.S. Pat. No. 5,628,383 of McIntyre. While these patents show and describe arrangements that have many fine features, they generally suffer from having an integrated design wherein the seat is not a separable item from the tree stand, the mechanism is cumbersome and complex, and they can take a substantial amount of time to set up for use.

Other outsdoorsmen require convenient seating near the ground. For example, turkey hunting is conventionally carried out near ground level, rather than from an elevated platform. In order for a turkey hunter to remain still for long periods of time, a portable chair would be helpful. Ideally, such a chair should also be useful with a tree stand in order to maximize the value of the chair.

Accordingly, it can be seen that a need yet remains for a portable tree seat which works well near the ground and substantially above the ground (such as with a tree stand). Also, such a tree seat should be simple, quick and easy to mount, durable, lightweight, reliable, safe, comfortable, and inexpensive. It is to the provision of such a tree seat that the present invention is primarily directed.

SUMMARY OF THE INVENTION

Briefly described, in one form the present invention comprises a portable tree seat for temporary mounting to a tree. The portable tree seat includes a frame which includes an upright stanchion. The frame further includes a fork mounted to a lower portion of the upright stanchion for partly straddling a tree. An upper lug is mounted to an upper portion of the upright stanchion. Further, a generally U-shaped armrest frame is mounted to the upright stanchion. A seat bottom is suspended from the armrest frame and a lanyard is coupled to the upper lug and adapted to be draped about and secured about the tree to suspend the frame from the tree. With this construction, the portable tree seat is suspended by the lanyard and is stabilized by the fork partly straddling the tree.

Preferably, the lug is positioned at a top-most portion of the upright stanchion and the fork is positioned at a bottom-most portion of the upright stanchion. Also preferably, an anti-sway strap is adapted to be wrapped about the tree and the upright stanchion. Also preferably, the portable tree seat further comprises a substantially upright seat back coupled to the seat bottom.

Stated another way, the present invention comprises a portable tree seat for mounting to a tree temporarily and includes a frame having a lower fork for partly straddling and gripping a tree and an upper lug generally distal from the fork. A lanyard is coupled to the lug and is adapted to be secured around the tree to suspend the frame from the tree. A seat bottom is mounted to the frame for supporting a person upon the portable tree seat. Preferably, the upper lug is mounted to a top-most portion of the frame and the lower fork is positioned at a lower-most portion of the frame. Also preferably, the frame includes an upright stanchion and a generally U-shaped arm frame portion mounted thereto.

A tree seat according to the present invention has numerous advantages. Such a tree seat is simple, durable, lightweight, reliable, and safe. It also is comfortable and inexpensive and is easily transported. Furthermore, such a tree seat works very well near the ground and also works very well when placed well above the ground (such as when used with a tree stand). Also, a tree seat according to the present invention can be mounted to (and removed from) a tree very quickly and easily.

Accordingly, it is an object of the present invention to provide a tree seat which is simple in its construction, durable in use, and inexpensive to manufacture.

It is another object of the present to provide a tree seat which is lightweight and comfortable.

It is another object of the present invention to provide a tree seat which is reliable and safe.

It is yet another object of the present invention to provide a tree seat which can be mounted and dismounted to and from a tree quickly and easily.

It is another object of the present invention to provide a tree seat which works very well high above ground, as well as near the ground.

It is another object of the present invention to provide a tree seat which can be used in conjunction with a tree stand or can be used alone.

It is another object of the present invention to provide a tree seat which can be suspended from the trunk of a tree without requiring a complex and heavy attachment mechanism.

These and other objects, features, and advantages of the present invention will become more apparent upon reading the following specification in conjunction with the accompanying drawing figures.

BRIEF DESCRIPTION OF THE DRAWING FIGURES

DETAILED DESCRIPTION OF THE PREFERRED EMBODIMENT

Figure 1:
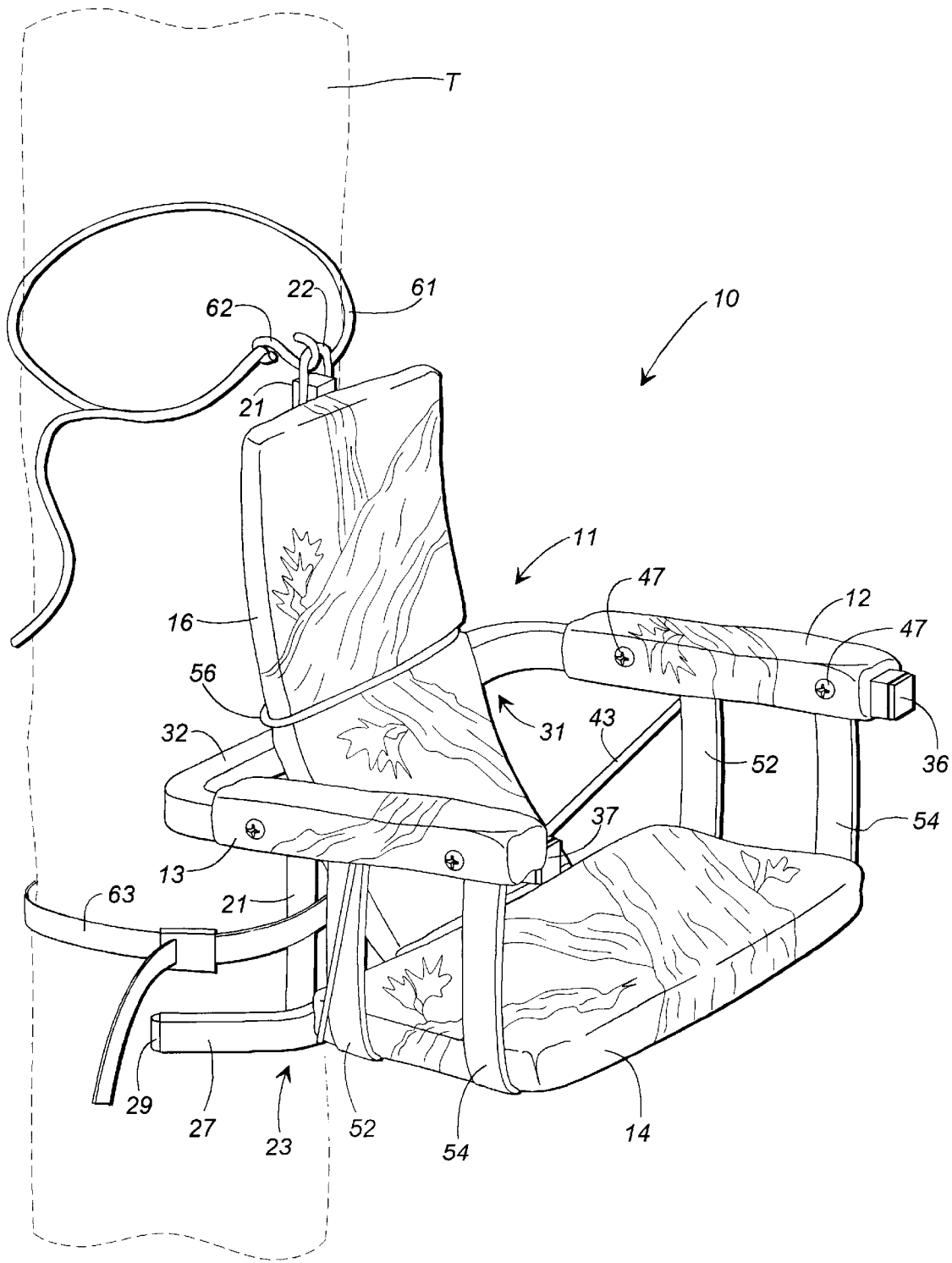
FIG. 1 is a perspective, schematic illustration showing a hanging tree seat according to a preferred form of the invention, and showing the hanging tree seat secured to the trunk of a tree.
Figure 2A:
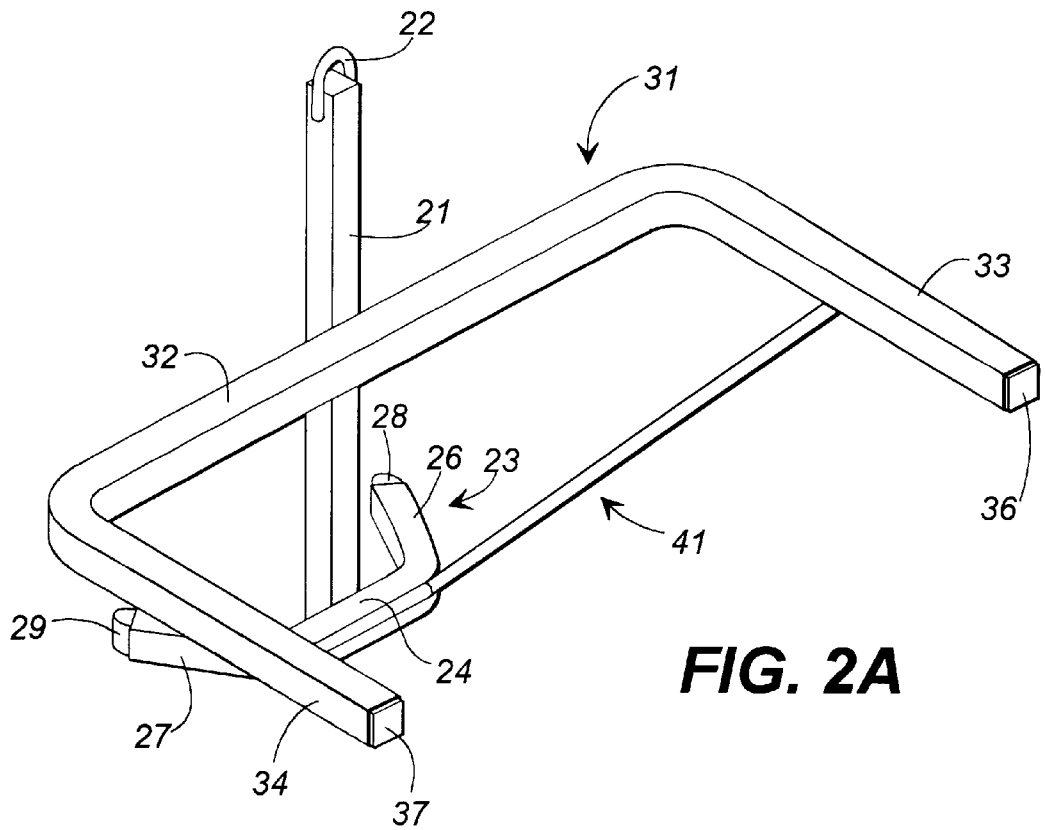
FIG. 2A is a perspective illustration of a frame portion of the hanging tree seat of FIG. 1.
Figure 2B:
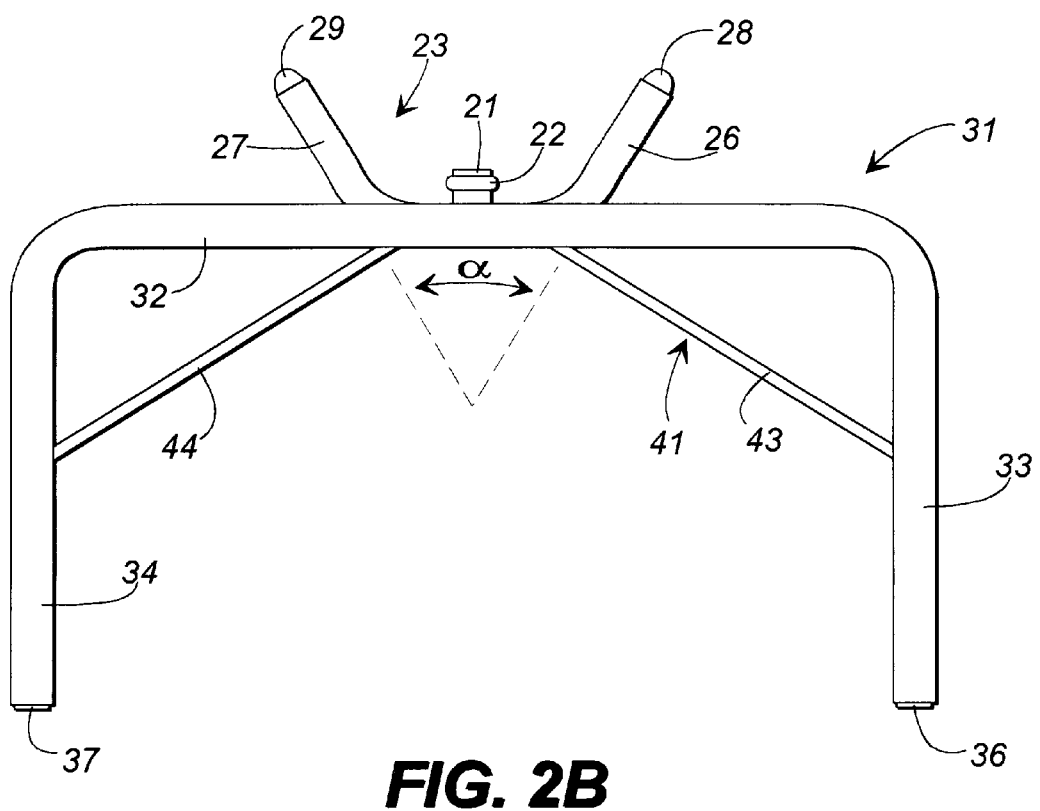
FIG. 2B is a plan view of the frame portion of the hanging tree seat of FIG. 2A.
Figure 2C:
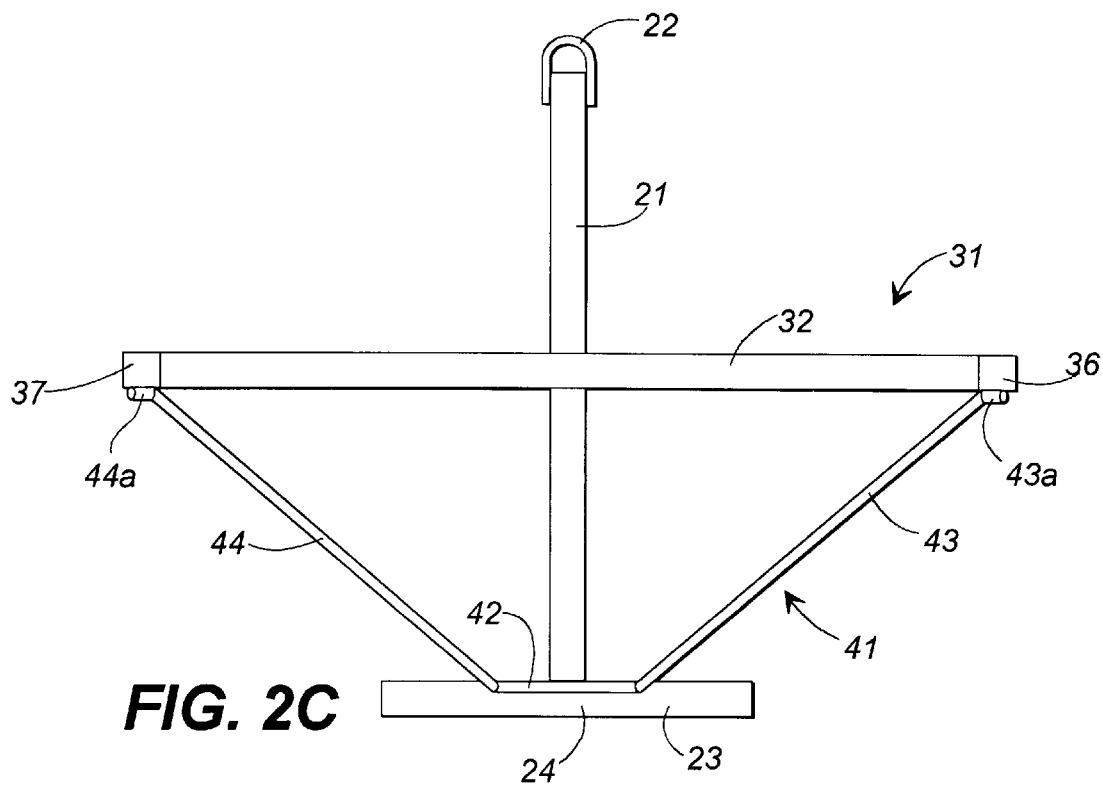
FIG. 2C is a front elevation view of the frame portion of the hanging tree seat of FIG. 2A.
Figure 2D:
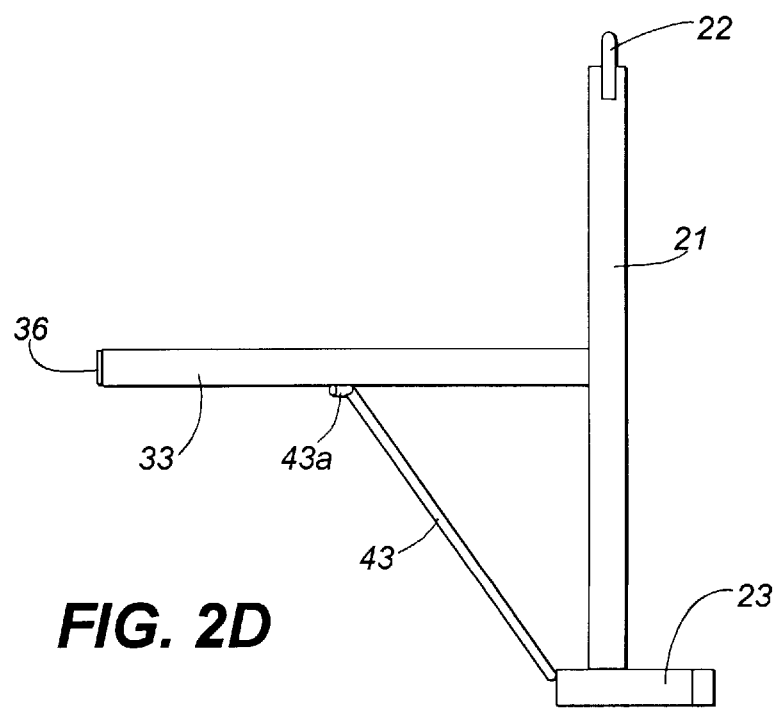
FIG. 2D is a right side elevation view of the frame portion of the hanging tree seat of FIG. 2A.

Referring now in detail to the drawing figures, wherein like reference numerals represent like parts throughout the several views, FIG. 1 shows a hanging tree seat 10 according to a preferred form of the invention. The hanging tree seat 10 is shown attached to a tree trunk T, shown in dashed lines. Of course, it will be understood by those skilled in the art that such a hanging tree seat 10 can also be attached to a telephone pole or power pole. The hanging tree seat 10 includes a frame assembly indicated generally at 11 carrying thereon first and second padded armrests 12 and 13. A seat bottom 14 is suspended from beneath the armrests 12 and 13 and a substantially upright seat back 16 extends upwardly from the seat bottom 14.

Referring now to FIGS. 1 and 2A–2D the frame assembly 11 will be considered in more detail. Frame assembly 11 includes an upright stanchion 21, at the top of which upright stanchion 21 a U-shaped lug or cleat 22 is affixed by welding. At the opposite (lower) end of the upright stanchion 21, a generally U-shaped yoke 23 is welded thereto. The U-shaped yoke 23 includes a transverse portion 24 which is welded to the upright stanchion 21 and a first tine 26 and a second tine 27 each extending from the transverse portion 24. The tines are splayed or angled away from one another, with the included angle a therebetween being about 30° in the commercial embodiment. Also in the commercial embodiment, the distal ends or tips of the tines 26 and 27 are about 7 inches apart, which enables the tree seat to work well with tree trunks having diameters ranging from about 8 to 30 inches. As shown in the drawing figures, plastic tips or buttons 28 and 29 are inserted into the hollow open ends of the tines 26 and 27. The buttons seal up the U-shaped yoke to keep moisture out, obscure sharp edges of the metal tubing to avoid injury, and provide a contact or engagement with the tree which minimizes damage to the tree from contact by the tubing. In this regard, it is pointed out that without the plastic buttons inserted into the ends of the tines, the otherwise sharp edges of the ends of the tines might cut into the bark of the tree, which ultimately can damage the tree. Also, the plastic buttons reduce noise by avoiding chipping off pieces of bark in use, for example when a user would shift his or her weight in the tree seat. The portion of the buttons extending proud of the ends of the tines are each shaped like a half of a cylinder and the buttons can be oriented when installed so that the cylinder is upright as depicted in the drawing figures, or can be oriented to be horizontal. By orienting the buttons upright, the effective distance or spread between the tines is slightly increased and damage to the tree trunk is further minimized by the curvature of the buttons. On the other hand, with the buttons oriented horizontally, the spread of the tines is slightly decreased to accommodate trees of somewhat smaller diameter and the grip on the tree trunk is slightly enhanced.

Just under half way up the length of the upright stanchion 21 a U-shaped armrest frame 31 is welded thereto. The upright stanchion 21, the U-shaped yoke 23, and the U-shaped armrest frame preferably are all made of 18 gauge steel tubing, 13/16" square. The armrest frame 31 includes a transverse intermediate portion 32 and arm portions 33 and 34. At the distal ends of the arm portions 33 and 34, flat button inserts 36 and 37 are inserted into the ends of the tubing to seal off the tubing and to prevent injury by contact with any sharp edge of the tubing.

A generally V-shaped strut 41 helps to support the arm portions 33 and 34. The V-shaped strut 41 includes a center portion 42 which is welded to the transverse portion 24 of the U-shaped yoke 23. Extending upwardly and forwardly from the center portion are stays 43 and 44, the ends of which (43a and 44a) are welded to the undersides of the arm portions 33 and 34 about half way between the distal ends of the arm portions 33 and 34 and the transverse intermediate portion 32 of the U-shaped armrest frame 31.

Figure 3:
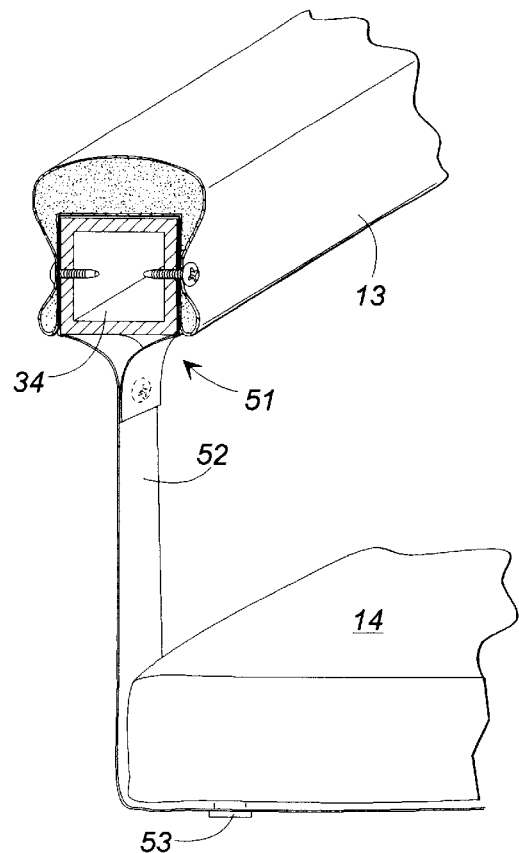
FIG. 3 is a partially cut-away, perspective, schematic illustration of a portion of the hanging tree seat of FIG. 1.

Referring once again specifically to FIG. 1, the armrests 12 and 13 are each secured to their respective arms 33 and 34 by four fasteners, such as fasteners 46 and 47 (and two more unshown fasteners) securing armrest 12 to arm 33. Likewise, armrest 13 is similarly secured to arm 34 with four fasteners. As best seen in FIG. 3, the fasteners extend through the padded armrests, such as armrest 13 and through a loop 51 of a webbing 52. In this way, the fasteners secure both the padded armrests and webbing 51 to the arms 33 and 34. The webbing 52 is attached loosely to the underside of the seat bottom 14 by being threaded through an opening formed between strappings, such as strapping 53, sewn to the underside of the seat bottom 14 and the underside of the seat bottom itself. As best seen in FIG. 1, the seat bottom is supported by two such pieces of webbing, webbing 52 and webbing 54. Each of the webbings 52 and 54 has a loop sewn at each of its ends and acts as a sling to support the padded seat bottom 14.

Each of the armrests 12 and 13, the seat bottom 14, and the upright seat back 16 include inner padding material covered with fabric, such as camouflage fabric. Moreover, the seat bottom and the upright seat back are made from two separate pieces of padding, which are covered with a single sewn-on cover so that the seat bottom and the seat back are connected to each other flexibly. To help keep the upright seat back upright and in place should a user stand up, the upright seat back is loosely held in place by an elastic cord 56 wrapped about and extending around the seat back 16 and the upright stanchion 21.

The hanging tree seat 16 is also provided with a lanyard 61 which is permanently attached at one end to the lug 22. The lanyard preferably comprises a rope, but could also be a chain, a strap, a fabric belt, etc. The other end of the lanyard has a steel S-hook 62 permanently attached thereto. The lanyard 61 is of a suitable length to allow it to be looped once about large diameter tree trunks to hook the S-hook onto the lug and to be looped twice about smaller diameter tree trunks and hooked onto the lug 22. By having both ends of the lanyard attached to the lug (essentially at a single pont), more of the length of the lanyard is in frictional contact with the tree trunk, improving the grip of the lanyard. An anti-sway strap 63 is provided to be looped around the tree trunk and around the upright stanchion 21 to prevent the hanging tree seat from swaying or swinging once mounted to a tree.

Figure 4:
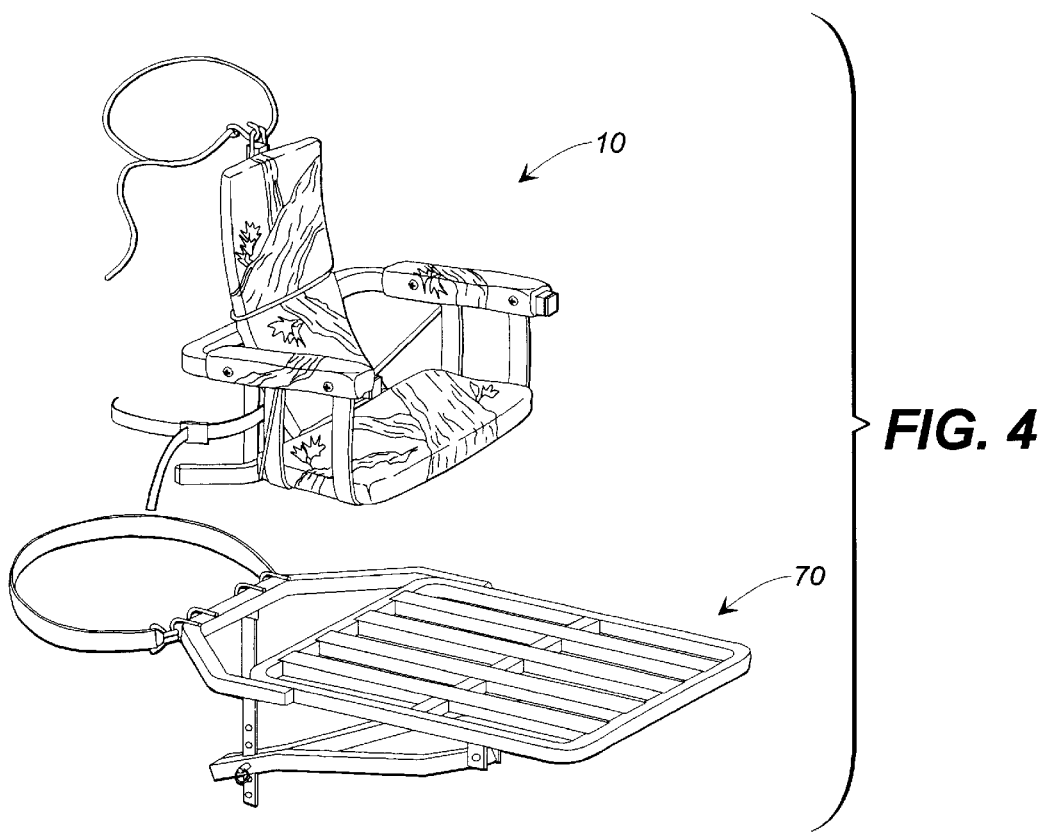
FIG. 4 is a schematic, perspective illustration of the hanging tree seat of FIG. 1, shown in conjunction with a tree stand for coordinated use therewith.

FIG. 1 shows the use of the hanging tree seat by itself, such as near the ground. Alternatively, as shown in FIG. 4, the hanging tree seat 10 can be used with a tree stand, such as tree stand 70, and can be positioned well above the ground.

In use, the tree seat is designed to attach easily and quickly to trees about 8" to 30" in diameter. When attaching the tree seat to a tree, the lanyard with the S-hook on it is looped around the tree and hooked to the lug. If the tree is of smaller diameter, it may be necessary to loop the lanyard around the tree twice. It is not necessary to have the rope very tight because the seat "hangs" from the tree. With the tree seat thus hanging from the lanyard, the tines of the yoke partly straddle the trunk of the tree and provide a stable engagement with the tree. To help hold the tree seat against swaying, the anti-sway strap is then threaded around the tree and the upright stanchion. The anti-sway strap should be positioned slightly above the lower yoke, and should be securely tightened. In all, the tree seat can be attached to a tree trunk in about 15 seconds or so. This can be important in many outdoor activities, such as hunting. The hanging tree seat also attaches to a tree very quietly, which has obvious advantages in hunting or photography activities.

The commercial embodiment of the invention, although extremely safe and dependable, is nonetheless provided with an additional safety belt or safety harness which is secured to the U-shaped armrest frame and is provided to be looped about the tree trunk and secured around the chest of the user to keep the user safe from injury should he fall out of the tree seat and keep the user safe from injury should the tree seat somehow, such as by catastrophic failure of the lanyard, become detached unexpectedly from the tree. The use of safety harnesses in connection with tree seats and tree stands is widely known and is strongly encouraged.

While the invention has been disclosed in a preferred form, it will be understood by those skilled in the art that many modifications, additions, and deletions can be made therein without departing from the spirit and scope of the invention as set forth in the following claims.

What is claimed is:

1. A portable non-climbing tree seat for temporary mounting to a tree in a fixed position and comprising:
    a frame including:
        an upright stanchion;
        a fork mounted to a lower portion of said upright stanchion for partly straddling a tree trunk;
        an upper lug mounted to an upper portion of said upright stanchion; and
        a generally U-shaped armrest frame mounted to said upright stanchion;
    a seat bottom suspended from said armrest frame and a substantially upright seat back coupled to said seat bottom; and
    a lanyard coupled at two points to said upper lug and adapted to be draped about and loosely secured about the tree to suspend said frame from the tree, whereby said portable tree seat is suspended by said lanyard and is stabilized by said fork partly straddling the tree trunk.

2. A portable tree seat as claimed in claim 1 wherein said lug is positioned at a top-most portion of said upright stanchion.

3. A portable tree seat as claimed in claim 1 wherein said fork is positioned at a bottom-most portion of said upright stanchion.

4. A portable tree seat as claimed in claim 1 further comprising an anti-sway strap adapted to be wrapped about the tree and the upright stanchion.

5. A portable tree seat as claimed in claim 1 wherein said fork comprises first and second splayed tines oriented at an acute angle with respect to one another.

6. A portable tree seat as claimed in claim 1 wherein said seat back is loosely held against unrestrained motion by an elastic cord.

7. A portable tree seat as claimed in claim 1 wherein one end of said lanyard is permanently coupled to said lug and an opposite end of said lanyard is detachably coupled to said lug.

8. A portable tree seat as claimed in claim 1 further comprising struts extending between said fork and said armrest frame for supporting said armrest frame.

9. A portable tree seat as claimed in claim 1 wherein said fork includes tines and further includes plastic buttons mounted in end portions of said tines.

10. A portable non-climbing tree seat for temporary mounting to a tree in a fixed position and comprising:
    a frame including a lower fork for at least partly straddling and gripping a tree and an upper lug generally distal from said fork;
    a lanyard coupled at two points to said lug and adapted to be secured loosely about the tree to suspend said frame from the tree; and
    a seat bottom mounted to said frame for supporting a person on said portable tree seat.

11. A portable tree seat as claimed in claim 10 wherein said upper lug is mounted to a top-most portion of said frame.

12. A portable tree seat as claimed in claim 10 wherein said frame comprises an upright stanchion to which said lower fork and said upper lug are mounted.

13. A portable tree seat as claimed in claim 10 wherein said frame comprises an upright stanchion and a generally U-shaped arm frame portion mounted thereto.

14. A portable tree seat as claimed in claim 13 further comprising an anti-sway strap adapted to be wrapped about the tree and said upright stanchion.

15. A portable tree seat as claimed as claim 10 wherein said frame comprises a generally U-shaped arm frame portion and wherein said seat bottom is suspended from said arm frame portion.

16. A portable tree seat as claimed in claim 10 wherein one end of said lanyard is permanently coupled to said lug and an opposite end of said lanyard is detachably coupled to said lug.

17. A portable tree seat as claimed in claim 10 wherein said fork includes tines oriented at an acute angle with respect to each other.

* * * * *